United States Patent [19]
Eggenberger et al.

[11] 3,748,540
[45] July 24, 1973

[54] TESTING AND MONITORING SYSTEM FOR REDUNDANT TRIP DEVICES

[75] Inventors: Markus A. Eggenberger, Schenectady; Charles L. Devlin, Ballston Lake, both of N.Y.

[73] Assignee: General Electric Company, Schenectady, N.Y.

[22] Filed: Sept. 2, 1971

[21] Appl. No.: 177,309

[52] U.S. Cl............. 317/135 R, 307/204, 307/219, 324/28 R
[51] Int. Cl. .......................................... H01h 47/00
[58] Field of Search...................... 307/204, 219, 92, 307/113, 118, 144; 317/135; 176/24; 324/28 R; 340/253 B, 256

[56] References Cited
UNITED STATES PATENTS
3,510,760  5/1970  Hellstrom........................... 324/28 R
1,561,225  11/1925  Fry................................... 324/28 R
3,223,590  12/1965  Troeger........................... 317/135 A Primary Examiner—J. D. Miller
Assistant Examiner—Harvey Fendelman
Attorney—William C. Crutcher et al.

[57] ABSTRACT

Three or more pressure switches, each having two or more actuated contacts are connected together in a logic circuit with monitoring devices to detect contact failure so as to provide protection to the system while each pressure switch is tested while providing redundancy so that the probability of a trip action not to occur when it should is minimized. Although the principle of operation is illustrated using a pressure sensing trip system as an example, it is broadly applicable to any type of redundant, testable protective system.

1 Claim, 13 Drawing Figures

FIG.3 (PRIOR ART)
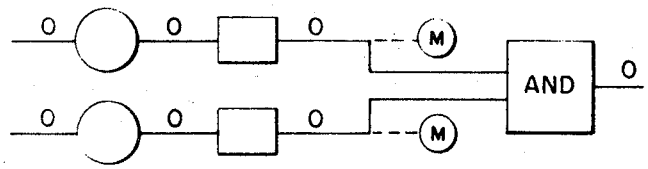
NORMAL
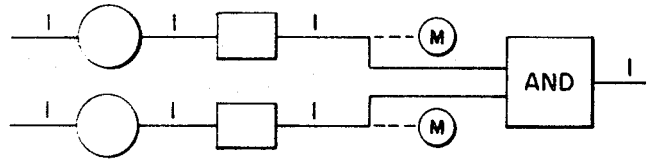
NORMAL TRIP
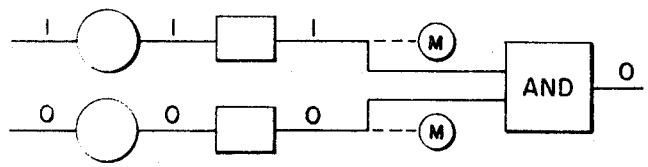
NORMAL TEST
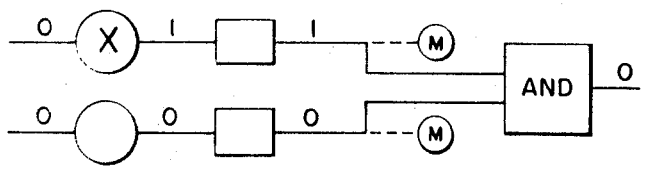
MECHANICAL FAILURE
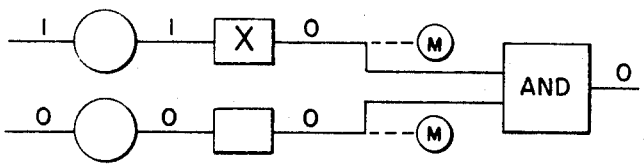
TEST WITH ELECTRICAL CONTACT FAILURE
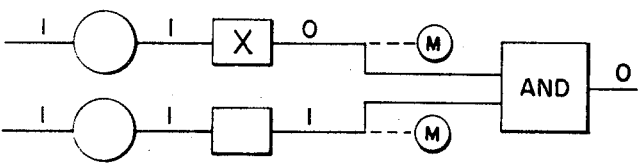
ATTEMPTED TRIP WITH ELECTRICAL CONTACT FAILURE
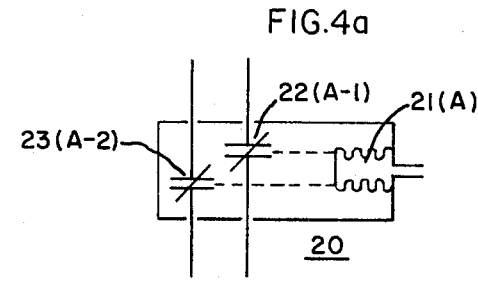
FIG.4a
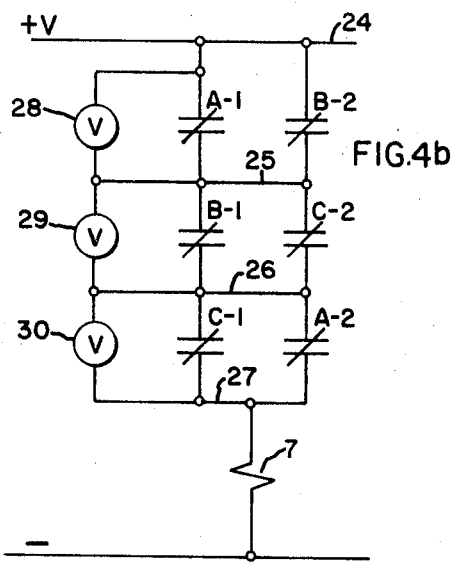
FIG.4b

NORMAL TEST

TEST WITH CONTACT FAILURE

ATTEMPTED TRIP WITH CONTACT FAILURE

TESTING AND MONITORING SYSTEM FOR REDUNDANT TRIP DEVICES

BACKGROUND OF THE INVENTION

This invention relates generally to protective systems for operating systems and, more particularly, relates to monitoring and testing of such protective systems while maintaining protection of the operating system.

A particular type of protective system for an operating system might be an arrangement for sensing the pressure in a fluid line and having an actuator closing electrical contacts to energize a relay which takes corrective action necessary in the event of falling fluid pressure. The corrective action might be closing of a valve to protect the operating fluid system.

Although a simple protective system would require only one pressure sensor and actuator, the possibility of failure of such a sensor has led to the use of testing devices for artificially testing the sensor with a signal similar to that intended to actuate it in operation. Since the protective system is now out of operation while it is being tested, two such sensors have normally been provided in the past. One of the sensors protects the operating system while the other is being tested. The two sensors are connected with their actuated contacts in series, so that testing one of them will not cause the protective system to carry out its usual function. This is sometimes known as a logical AND arrangement, because both of the sensors must normally be actuated to complete the circuit. Monitoring devices have also been provided to detect whether the contacts actually close when the pressure switch is actuated.

The foregoing described monitoring and testing arrangement for a protective system has an important shortcoming. By connecting the two sensors in a logical AND combination, all of the devices must function properly during a "normal" failure of the operating system. Therefore, if one of the sensors fails to close its contacts, even though actuated, the protective system will not function properly. Thus, the probability of a trip action not to occur when it should has been increased by the addition of the second sensor.

Accordingly, one object of the present invention is to provide an improved arrangement for testing and monitoring a protective system without reducing the probability of the protective system to function when it should.

Another object of the invention is to provide an improved testing and monitoring arrangement of redundant devices in a protective system.

DRAWING

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

FIG. 1 is a simplified schematic drawing of a prior art pressure sensing protective system connected for enabling testing of the pressure switches, FIG. 2 is a catalog of logic symbols used to represent the elements of a pressure switch or any comparable device, FIG. 3 is a logic diagram of the prior art arrangement of FIG. 1 redrawn using the logic symbols of FIG. 2, FIG. 4a is a simplified drawing of a two-pole pressure switch, FIG. 4b is a redundant monitoring and testing system according to the present invention in its preferred form showing the circuit connections of pressure switches like those in FIG. 4a, FIGS. 5a, 5b, and 5c are logic diagrams of the arrangements shown in FIG. 4b under three different conditions of operation, FIG. 6a is a simplified drawing of a three-pole pressure switch, FIG. 6b is a circuit connection for a more complex protective system connecting the contacts of pressure switches shown in FIG. 6a, FIG. 7 is a logic diagram corresponding to FIG. 6b, FIG. 8 is a generalized logic diagram illustrating the principle of operation of FIG. 4b applied to any number of sensors, and FIG. 9 is a similarly generalized logic diagram according to the principle of the FIG. 6b circuit.

SUMMARY OF THE INVENTION

Briefly stated, the invention is practiced by providing a protective system of a number $s$ of sensor actuators responsive to a condition of an operating system, each of the actuators operating a set of $n$ actuated devices, $n$ being less than $s$, and a matrix of logical devices or connections arranged to allow testing of individual sensors without tripping, while providing redundant channels to increase the probability of proper functioning of the protective system, despite isolated failure of sensors or actuated devices. The condition of the actuated devices is sensed by a number of monitoring devices.

DESCRIPTION OF THE PRIOR ART

Referring to FIG. 1 of the drawing, a fluid line 1 has pressure switches 2 and 3 connected thereto. Each pressure switch has a diaphragm actuator 4 operating to close a pair of electrical contacts 5 when the pressure falls below a selected value. Pressure switch 3 has a similar pair of contacts 6 connected in series with contacts 5 and the coil 7 of a low impedance trip relay or solenoid. A voltage source 8 will cause a current to flow through the trip coil 7 when both contacts 5 and 6 are closed.

Means for testing each of the individual pressure switches 2, 3 is provided by test solenoid valves 11, 12 respectively. Each of the test valves is arranged to vent the respective diaphragms so to close the contacts of the pressure switch, thereby simulating decrease of pressure. However, since contacts 5 and 6 are connected in series or in a logical AND arrangement, testing of one of the pressure switches can proceed without energizing coil 7, since the contacts on the other pressure switch remain open.

The foregoing describes the operation of a conventional monitoring and testing arrangement for a protective system. Although illustrated for a particular type of testable protective system, the principle of operation and the shortcoming of such a system is applicable to any type of testable protective system. Therefore, in order to generalize the description, logical symbols will be employed to reconstruct the pressure sensing system of FIG. 1.

In FIG. 2 the symbol for the dormant state is 0 and the symbol for the active state is 1. The mechanical actuator portion of the pressure switch is illustrated by a circle and the normal and actuated states are shown, as well as the expected failure mode. This would be actuation of the pressure switch diaphragm without decrease of fluid pressure, shown as a 0 input and a 1 output.

The symbol for the electrical contacts is a square. The drawing shows the normal, actuated and the expected failure case. The latter takes place when attempted closure of the contact is made, but there is no electrical connection made through the contacts, shown as a 1 input and a 0 output.

FIG. 2 shows that the foregoing symbols can be connected to represent a single contact pressure switch or a double contact pressure switch and that failures of different sorts will give different results. For example, mechanical failure of a single contact pressure switch results in a signal without input actuation, while electrical contact failure of the pressure switch results in 0 output despite an input signal represented by 1.

Referring now to FIG. 3 of the drawing, logic diagrams for the FIG. 3 prior art arrangement are shown for six possible conditions. The first or normal condition takes place when the operating system is functioning properly and a 0 input results in a 0 output. When a failure in the operating system provides a 1 input and both sensors function properly, a 1 output results in a normal trip, taking corrective action.

A normal test of one of the sensors is indicated by a 1 input to one of the branches. Proper testing is indicated by comparison of monitor devices later to be described and indicated by an M in a circle, but the logical AND device prevents tripping of the operating system as shown by a 0 output.

Mechanical failure of one of the actuators gives the same indication to the system as a normal test. The system will not trip as indicated by the 0 output, but failure is indicated by the monitors since it is known that the system is not being tested.

Testing of one of the sensors with a failure of the electrical contacts likewise will not cause the system to trip. This type of failure is indicated by the monitor devices M giving a different indication than in the normal test situation.

The shortcoming of the foregoing system is illustrated by the last diagram in FIG. 3. Failure of the operating system causes a 1 input to both sensors. However, failure of one of the electrical contacts, as shown, prevents the protective system from tripping as shown by the 0 output. Thus, the probability of the protective system operating as it should has been reduced because of the presence of the logical AND circuit, the latter being present in the system because of the desire to provide for testing without tripping the operating system.

DESCRIPTION OF THE PREFERRED EMBODIMENT

Figure 1:
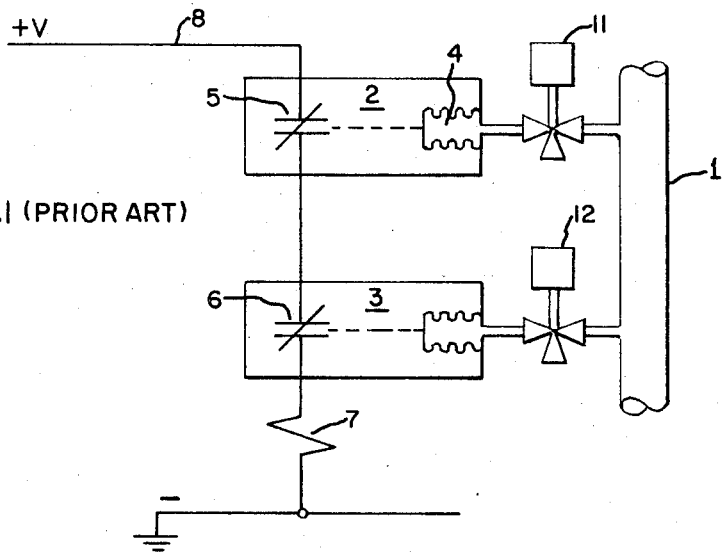
Figure 2:
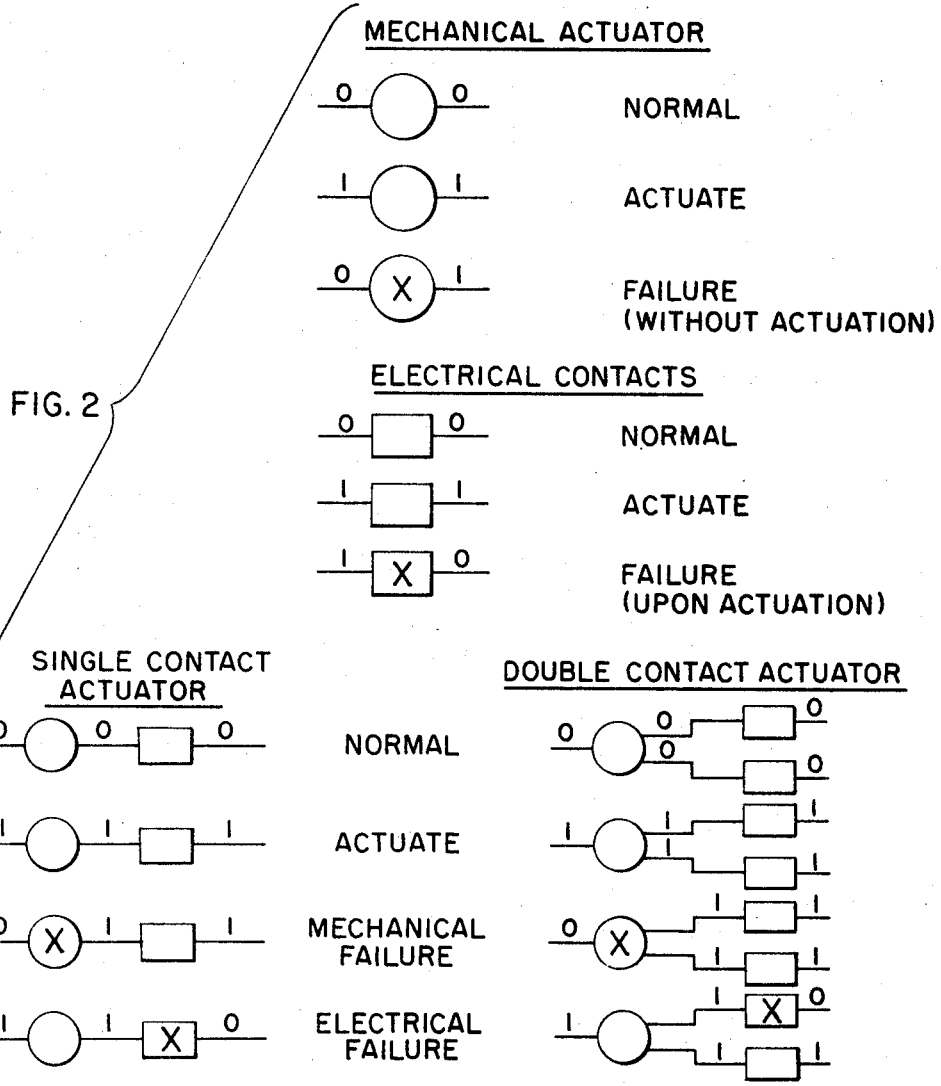

Referring to FIGS. 4a and 4b of the drawings, an improved system is shown according to the present invention. In 4a, each of the pressure switches indicated as 20 has a pressure diaphragm actuator 21 connected to close two pairs of contacts 22, 23 when the pressure decreases. Thus, if each actuator is designated by a letter such as A, the respective contacts are designated A-1 and A-2.

The circuit connections are shown in FIG. 4b. Contacts A-1 and B-2 are connected in parallel between leads 24, 25 to provide a first parallel circuit or logical OR arrangement, since closure of either of the contacts will complete a circuit between leads 24, 25. Similarly, contacts B-1 and C-2 are connected in parallel to form a second logical OR between lead 25 and lead 26. Contacts C-1 and A-2 are connected in a third parallel circuit between leads 26, 27.

A series connection is established from lead 24 connected to a voltage source through the three aforementioned parallel circuits and a low impedance trip relay coil 7. This is equivalent to a logical AND device, since a path through all three parallel circuits must be made before the relay coil 7 is energized.

Monitoring devices comprising high impedance voltmeters 28, 29, 30 are connected across the respective pairs of contacts as shown. In this particular arrangement, only three monitoring devices are necessary. Testing of actuator C closes contacts C-1 and C-2 causing full voltage to appear across voltmeter 28. If sensor C is tested and only one of the pairs of contacts such as C-1 closes, one half of the total voltage appears across voltmeter 28. This indicates electrical contact failure. In the more general case, a monitoring device is used for each contact.

Figure 5A:
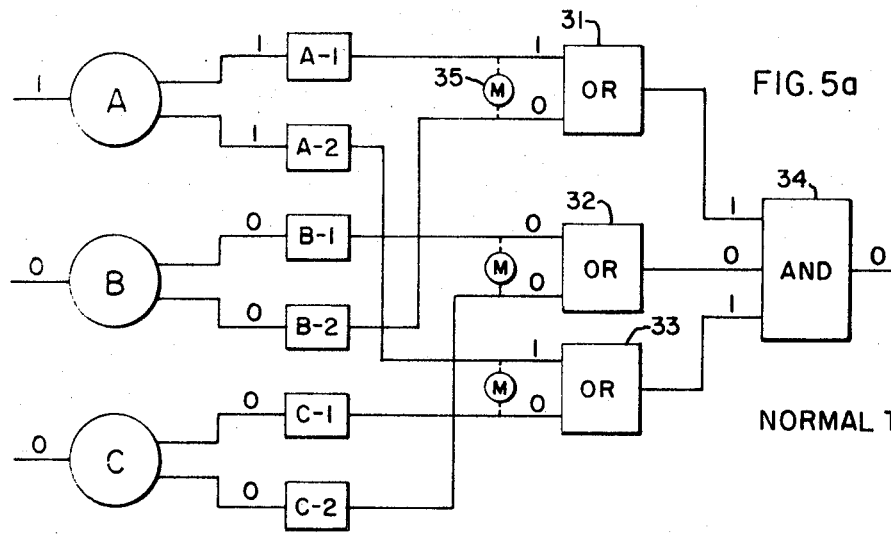
Figure 5B:
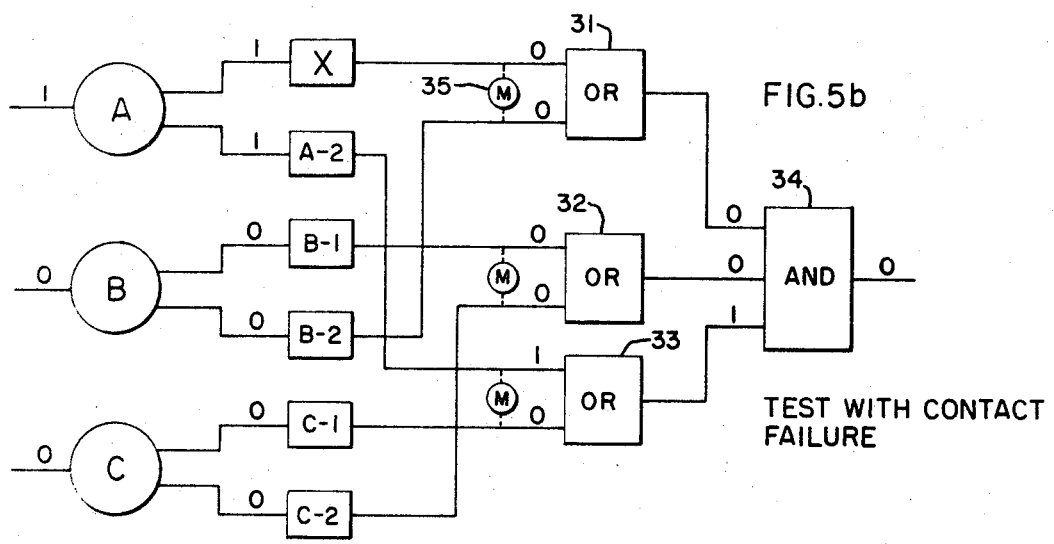
Figure 5C:
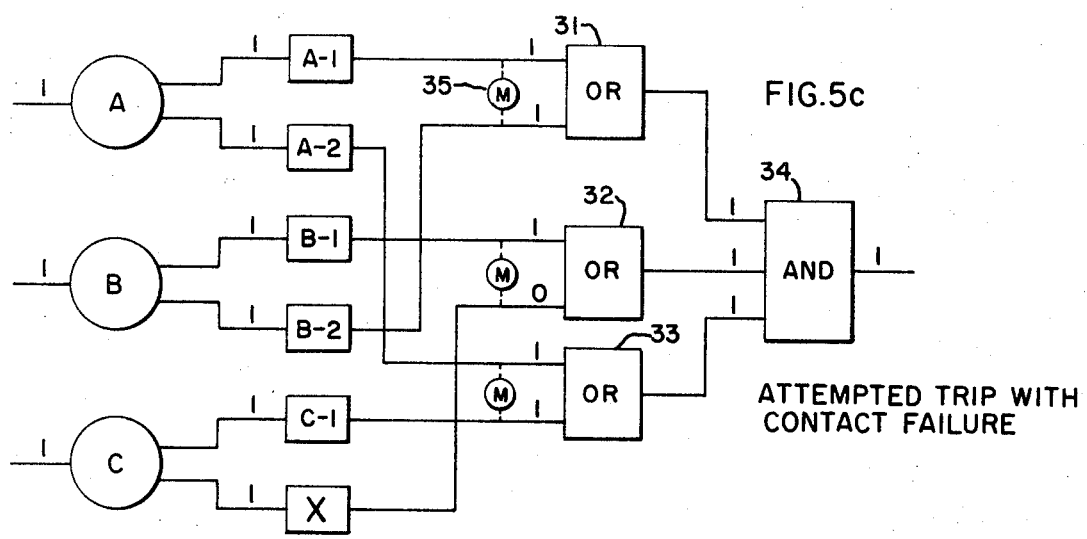

Referring successively to FIGS. 5a through 5c of the drawing, identical logic diagrams are illustrated which are equivalent to the circuit of FIG. 4b. Three logical OR devices 31, 32, 33 are shown which correspond to the three parallel connected pairs of contacts in FIG. 4b. A logical AND device 34 is shown representing the series connection of the aforementioned parallel circuits. Each of the logical OR devices has two inputs from selected pairs of actuated devices from different actuators. For example, the inputs to logical OR 31 are outputs from actuated devices A-1 and B-2 from actuators A, B, respectively. The logical AND device 34 has three inputs, one from each logical OR device.

FIG. 5a shows the configuration during a normal test of actuator A as indicated by a 1 input while inputs 0 and 0 are applied to the two remaining actuators B and C. OR devices 31, 33 receive a 1 input but OR device 32 does not. Therefore, AND device 34 does not have a sufficient number of 1 inputs and hence the protective system does not inadvertently function, as indicated by the 0 output from AND 34, but it is still protecting the system if the OR circuits should be actuated by an actual failure of the fluid pressure, i.e., 1 inputs to actuators B or C.

FIG. 5b shows the same logic diagram with failure of the actuated device A-1 resulting in a 0 input to OR 31. Again, the system does not trip, but the monitor device 35 distinguishes the difference between conditions existing in FIGS. 5a and 5b, thereby giving an indication of electrical contact failure.

FIG. 5c illustrates the logic configuration in the event of an attempted trip of the protective system with failure of one of the elements, a situation for which the present invention provides a solution. Here the protective system is actuated as indicated by a 1 input to each of the three actuators A, B and C. There is indicated a failure of an actuated device C-2 resulting in a 0 input to OR device 32. There is, nevertheless, a 1 output from OR device 32 to AND device 34 and the system will function as indicated by a 1 output from AND 34.

The system illustrated in FIGS. 4a, 4b and 5a, 5b and 5c is designated a "two out of three" redundant protective system, since there are three actuators but only two of them need to function properly to perform the trip function.

MODIFICATION

Figure 6A:
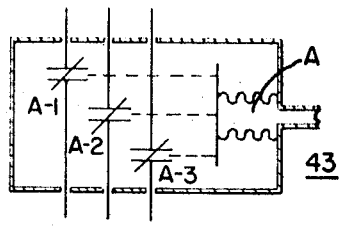
Figure 6B:
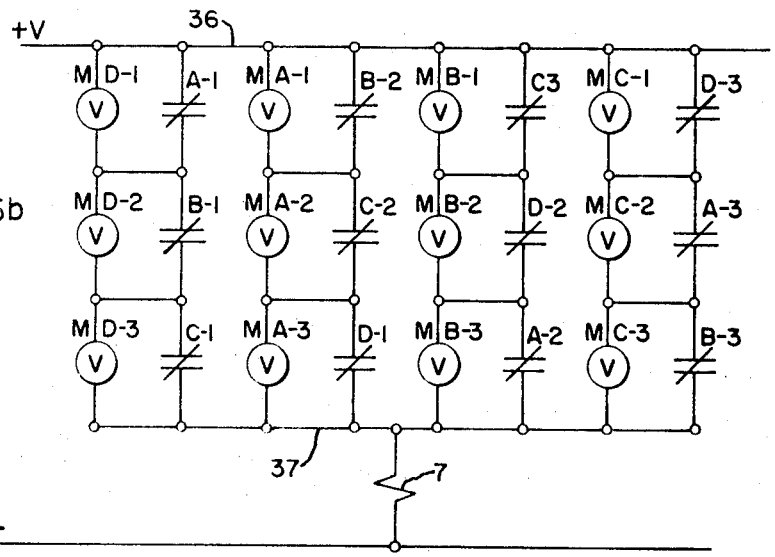

Referring now to FIGS. 6a and 6b, a "three out of four" redundant protective system using a slightly different logic matrix is illustrated. FIG. 6a shows a three-pole pressure switch 43. The notation used is as before with an actuator A operating sets of contacts A-1, A-2, A-3.

FIG. 6b illustrates the circuit matrix with four series paths (or logical AND connections) connected in parallel (so as to comprise an OR connection). A first series path comprises contacts A-1, B-1, C-1. A second series path comprises contacts B-2, C-2, D-1. A third series path comprises contacts C-3, D-2, A-2 and a fourth series path comprises contacts D-3, A-3 and B-3. All four series paths are connected in parallel by leads 36, 37 and the circuit is then connected to a voltage source and to relay coil 7.

Figure 7:
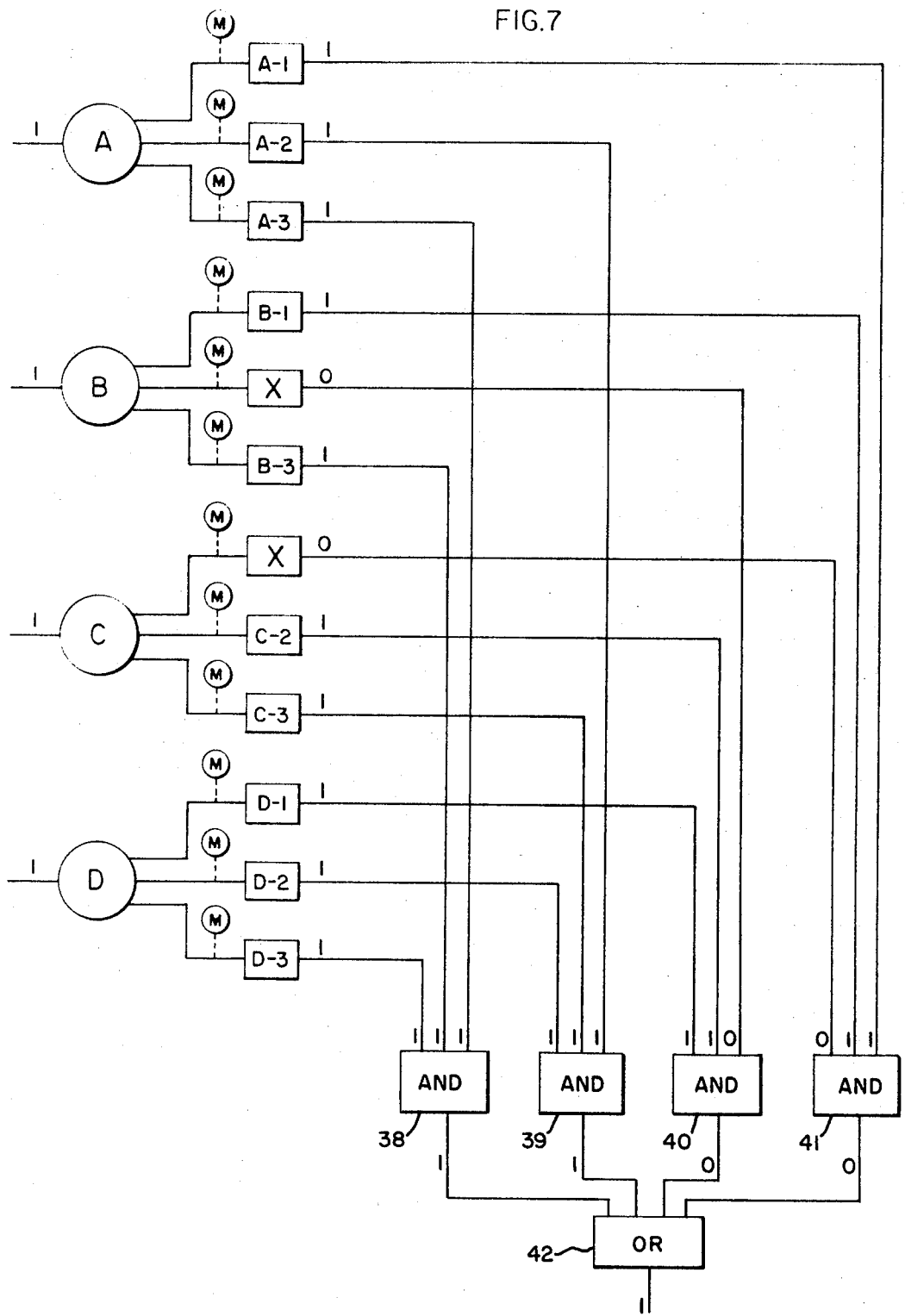

FIG. 7 is a logic diagram corresponding to the circuit shown in FIG. 6b. Logical AND devices 38, 39, 40 and 41 correspond to the four series paths of the circuit diagram, while logical OR device 42 corresponds to the parallel connection of the four series paths. As indicated, each of the logical AND devices has three inputs from one actuated device of each of three separate actuators. For example, AND 38 has an input from actuated devices A-3, B-3 and D-3. The logical OR device 42 has an input from each of the AND devices. By following the paths, it should be apparent that one actuator can be tested without tripping the system, but distinction between a normal trip and failure of an actuated device can be made by the monitors M. The system will trip when it is supposed to despite failures of isolated elements. For example, the system is shown here during an attempted trip with failure of contacts B-2 and C-1 to close properly. The trip takes place as it should.

GENERALIZATION OF THE INVENTION

Figure 8:
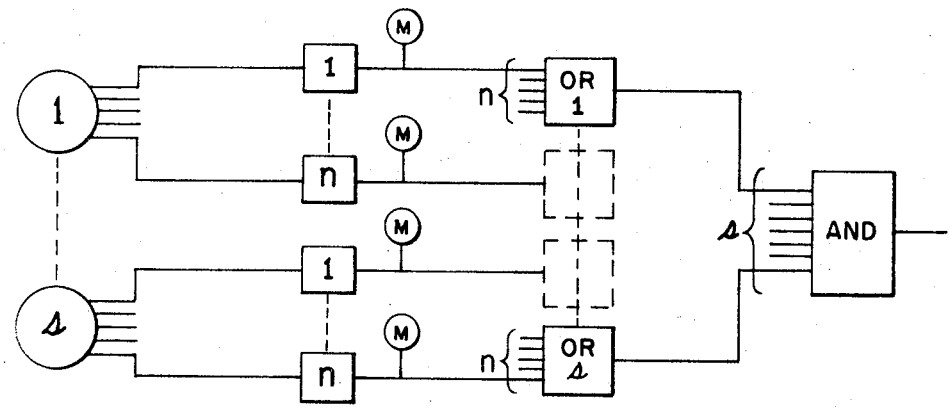

FIG. 8 is a generalization of the logic diagram of FIGS. 5a–5c, wherein there are s actuators each having a set of n actuated devices. It should be noted that n is smaller than s in order to provide the ability to test an actuator without tripping the system.

There are s logical OR devices each having n inputs. Each of the OR devices has an output supplying a total of s inputs to a logical AND device, the latter having a single output connected to protect the operating system.

Figure 9:
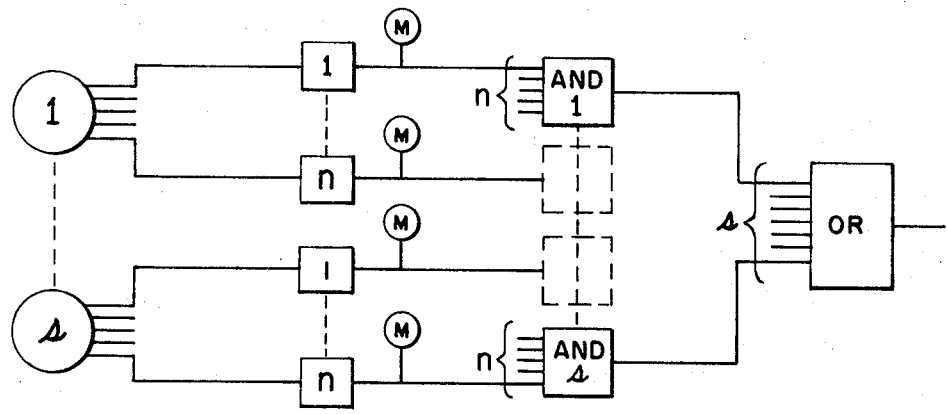

FIG. 9 is a generalization of the logic diagram of FIG. 7 indicating the reversal of position of logical AND and OR devices, which are considered to be complementary devices functionally. Again, it is necessary that the number n in each set of actuated devices be less than the number s of actuators.

There are any number of electrical, mechanical, fluidic, hydraulic, or pneumatic arrangements which can be used to provide the logical OR and AND devices used to illustrate the principle of the invention. Solid-state logic components operating on two levels of input voltage are commercially obtainable, and the equivalent arrangements can also be programmed in a digital computer by those skilled in the art.

OPERATION AND ADVANTAGES

The above-described invention by providing multiple sensor actuators each with multiple actuated devices and connection of the outputs of monitored actuated devices into redundant channels by means of a logical matrix provides the following functions:

1. A single sensor with its actuated devices can be tested without tripping the operating system.
2. Failure of one actuator will not trip the operating system.
3. Failure of isolated actuated devices will not trip the system and the greater the complexity of the system, the less probable it is for multiple failure of actuated devices to inadvertently trip the operating system.
4. Any desired degree of redundancy can be provided by utilizing more complexity in the logic matrix through the use of more redundant channels, thereby increasing the probability that the system will trip when it should, despite failure of one or more elements.
5. Probability of success or failure of the system can be calculated by those skilled in the art, knowing the probability of different failure modes of individual elements.

While there has been described what is considered to be the preferred embodiment of the invention and extension of the principle to more complex systems in general logical terms, it is desired to cover in the appended claims all such modifications as fall within the true spirit and scope of the invention.

What is claimed is:

1. In a protection system for detecting variation in a sensed condition of an operating system and taking action to protect said operating system, the combination of:

a plurality $s$ of actuators responsive to said sensed condition, a plurality of actuated devices grouped in sets of $n$, each set operatively connected to one of said actuators, $n$ being smaller than $s$, a plurality of first logical means each having a plurality of $n$ inputs from said actuated devices, and second logical means of a complementary type having an output from each of said first means connected as an input thereto, said second means output being operatively connected to means for protecting said operating system, wherein said first means comprise $s$ logical AND means each with $n$ inputs and wherein said second means is a logical OR with $s$ inputs.

* * * * *